(12) United States Patent
Kuroki

(10) Patent No.: US 12,231,757 B2
(45) Date of Patent: Feb. 18, 2025

(54) IMAGING APPARATUS

(71) Applicant: Panasonic Intellectual Property Management Co., Ltd., Osaka (JP)

(72) Inventor: Hiroyuki Kuroki, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 144 days.

(21) Appl. No.: 17/994,084

(22) Filed: Nov. 25, 2022

(65) Prior Publication Data

US 2023/0262306 A1 Aug. 17, 2023

(30) Foreign Application Priority Data

Feb. 15, 2022 (JP) ................. 2022-021398

(51) Int. Cl.
*H04N 23/55* (2023.01)
*G02B 5/20* (2006.01)
(Continued)

(52) U.S. Cl.
CPC ............. *H04N 23/55* (2023.01); *G02B 5/205* (2013.01); *G02B 7/006* (2013.01); *H04N 23/62* (2023.01)

(58) Field of Classification Search
None
See application file for complete search history.

(56) References Cited

U.S. PATENT DOCUMENTS 6,452,732 B1 * 9/2002 Okada .................. G02B 26/023
                                                    359/813
12,114,053 B2 * 10/2024 Kuroki ................... H04N 23/50
(Continued)

FOREIGN PATENT DOCUMENTS

JP        2016029421 A  *  3/2016
WO     2021/200141 A1      10/2021

OTHER PUBLICATIONS

Translation of JP2016029421 Author: Arai N Date: Mar. 3, 2016 (Year: 2016).*

*Primary Examiner* — Twyler L Haskins
*Assistant Examiner* — Wesley J Chiu
(74) *Attorney, Agent, or Firm* — Renner, Otto, Boisselle & Sklar, LLP

(57) ABSTRACT

The present disclosure facilitates access to an imaging surface of an imaging element in an imaging apparatus in which a plurality of optical filters are selectively arranged in front of the imaging surface of the imaging element.

An imaging apparatus includes an imaging element including an imaging surface on which light from a subject is incident, a first filter unit including a first optical filter, a second filter unit including a second optical filter, and a filter unit drive mechanism that drives each of the first and second filter units between a filtering position in front of the imaging surface and a retracted position deviated from the front of the imaging surface. The filter unit drive mechanism selectively executes an interlocking mode in which when one of the first and second filter units is located at the filtering position, the other of the first and second filter units is interlocked so as to be located at the retracted position, and a single motion mode in which one of the first and second filter units is maintained in a stopped state at the retracted position and the other one is driven.

6 Claims, 15 Drawing Sheets

(51) Int. Cl.
 *G02B 7/00* (2021.01)
 *H04N 23/62* (2023.01)

(56) References Cited

U.S. PATENT DOCUMENTS

| | | | |
|---|---|---|---|
| 2021/0200059 A1* | 7/2021 | Iinuma | G02B 5/205 |
| 2022/0224814 A1* | 7/2022 | Yoshimuta | H04N 23/75 |
| 2023/0280634 A1* | 9/2023 | Totori | G03B 17/02 |
| | | | 396/493 |
| 2023/0280638 A1* | 9/2023 | Inoue | G03B 5/00 |
| | | | 359/601 |

* cited by examiner

IMAGING APPARATUS

BACKGROUND OF THE INVENTION

Field of the Invention

The present disclosure relates to an imaging apparatus.

Description of the Related Art

For example, WO 2021/200141 A discloses an imaging apparatus including a filter unit whose light transmittance can be changed. The filter unit includes a plurality of different optical filters and a disk that supports the plurality of optical filters. The plurality of optical filters are provided on the disk side by side in the circumferential direction around the rotation center line of the disk. As the disk rotates, one optical filter is disposed in front of an imaging surface of an imaging element.

SUMMARY OF THE INVENTION

Meanwhile, in the case of the imaging apparatus described in WO 2021/200141 A, the imaging surface of the imaging element cannot be accessed unless the filter unit is removed. Therefore, cleaning such as removing dust and the like attached to the imaging surface of the imaging element cannot be easily performed.

Therefore, an object of the present disclosure is to facilitate access to an imaging surface of an imaging element in an imaging apparatus in which a plurality of optical filters are selectively arranged in front of the imaging surface of the imaging element.

In order to solve the above problem, one aspect of the present disclosure provides an imaging apparatus including:
- an imaging element including an imaging surface on which light from a subject is incident;
- a first filter unit including a first optical filter;
- a second filter unit having a second optical filter; and
- a filter unit drive mechanism that drives each of the first and second filter units between a filtering position in front of the imaging surface and a retracted position deviated from the front of the imaging surface, in which
- the filter unit drive mechanism selectively executes an interlocking mode in which when one of the first and second filter units is located at the filtering position, the other of the first and second filter units is interlocked so as to be located at the retracted position, and a single motion mode in which one of the first and second filter units is maintained in a stopped state at the retracted position and the other one is driven.

The present disclosure facilitates access to an imaging surface of an imaging element in an imaging apparatus in which a plurality of optical filters are selectively arranged in front of the imaging surface of the imaging element.

DESCRIPTION OF THE PREFERRED EMBODIMENTS

Hereinafter, embodiments will be described in detail with reference to the drawings as appropriate. However, unnecessarily detailed description may be omitted. For example, a detailed description of a well-known matter and a repeated description of substantially the same configuration may be omitted. This is to avoid unnecessary redundancy of the following description and to facilitate understanding of those skilled in the art.

Note that the inventor(s) provides the accompanying drawings and the following description in order for those skilled in the art to fully understand the present disclosure, and does not intend to limit the subject matter described in the claims by the accompanying drawings and the following description.

Hereinafter, an imaging apparatus according to an embodiment of the present disclosure will be described with reference to the drawings.

Figure 1:
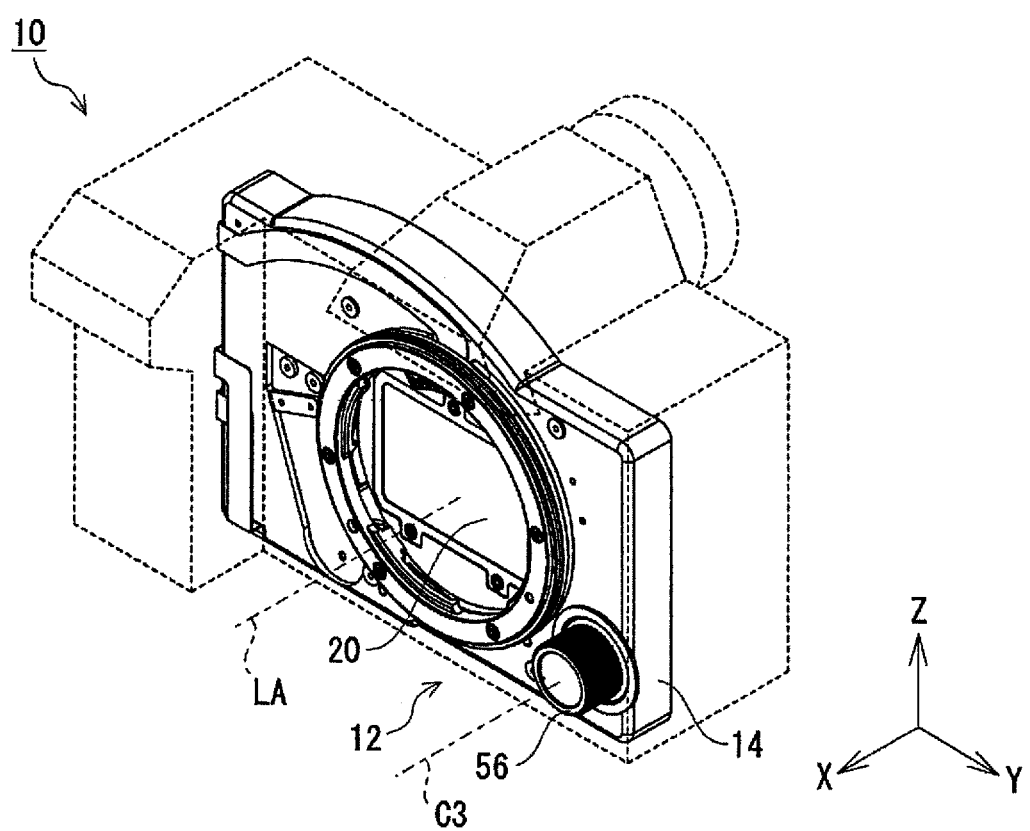
FIG. 1 is a schematic front perspective view of an imaging apparatus according to an embodiment of the present disclosure.

FIG. 1 is a schematic front perspective view of an imaging apparatus according to an embodiment of the present disclosure. Note that the X-Y-Z orthogonal coordinate system illustrated in the view is for facilitating understanding of the embodiment of the present disclosure, and does not limit embodiments of the present disclosure. The X-axis direction is a front-rear direction of the imaging apparatus, the Y-axis direction is a left-right direction, and the Z-axis direction is a height direction. Note that the side where the subject is present at the time of photographing is defined as the front side of the imaging apparatus.

As illustrated in FIG. 1, the imaging apparatus 10 according to the embodiment of the present disclosure includes a filter module 12.

Figure 2:
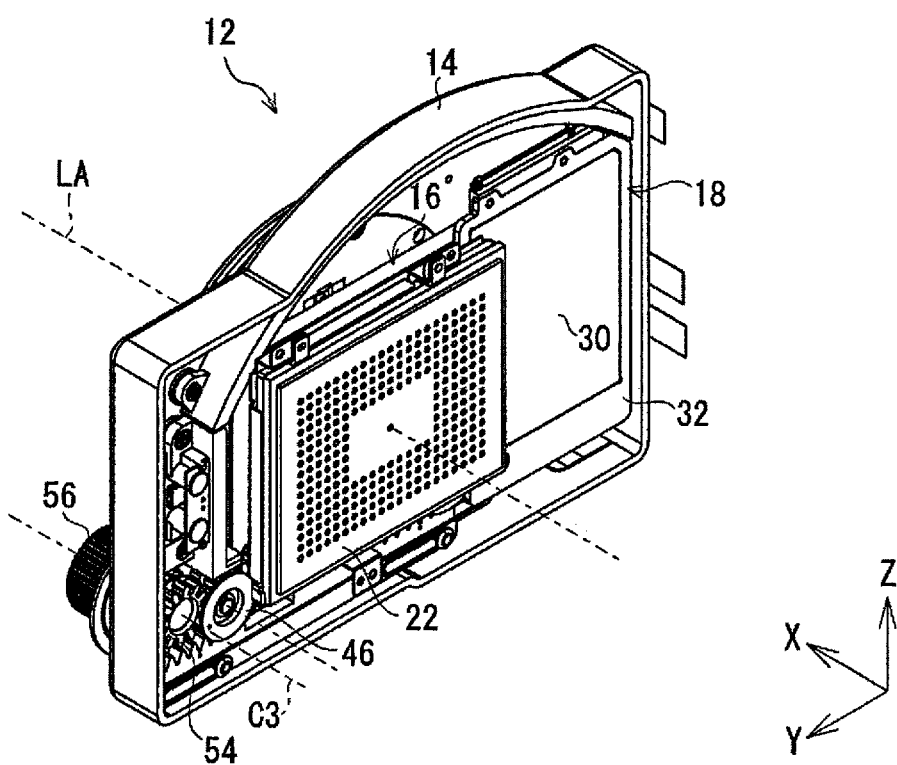
FIG. 2 is a rear perspective view of an imaging module and a filter module in a state where a first filter unit is disposed at a first filtering position and a second filter unit is disposed at a second retracted position.
Figure 3:
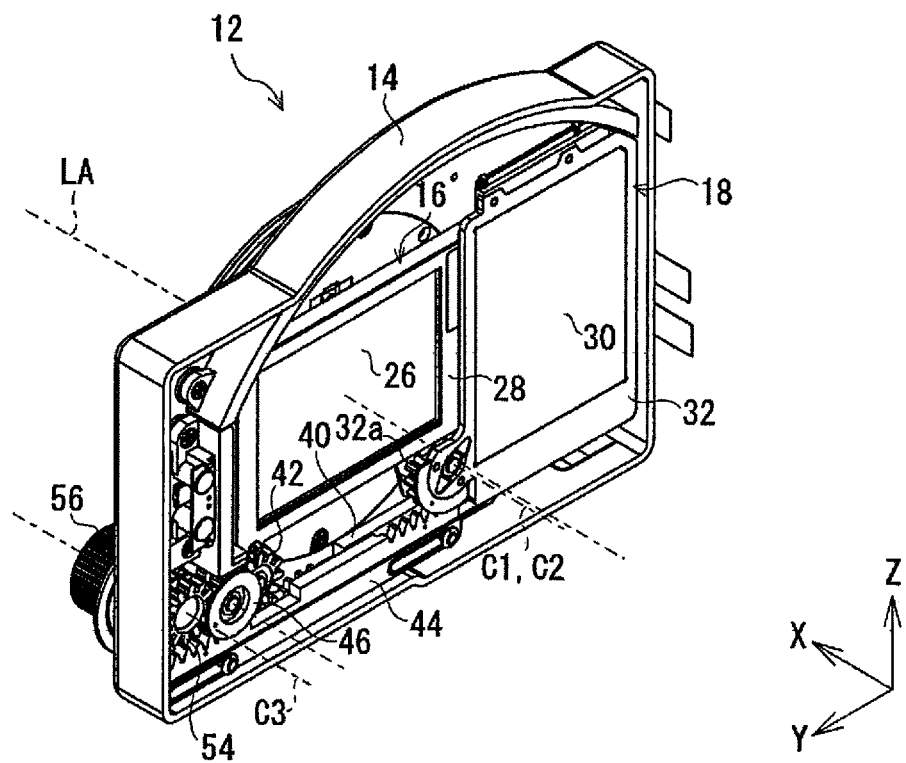
FIG. 3 is a rear perspective view of the filter module in a state where the first filter unit is disposed at the first filtering position and the second filter unit is disposed at the second retracted position.

FIG. 2 is a rear perspective view of an imaging module and a filter module in a state where a first filter unit is disposed at a first filtering position and a second filter unit is disposed at a second retracted position. FIG. 3 is a rear perspective view of the filter module in a state where the first filter unit is disposed at the first filtering position and the second filter unit is disposed at the second retracted position. That is, FIG. 3 corresponds to FIG. 2 in which the imaging module is omitted.

Figure 4:
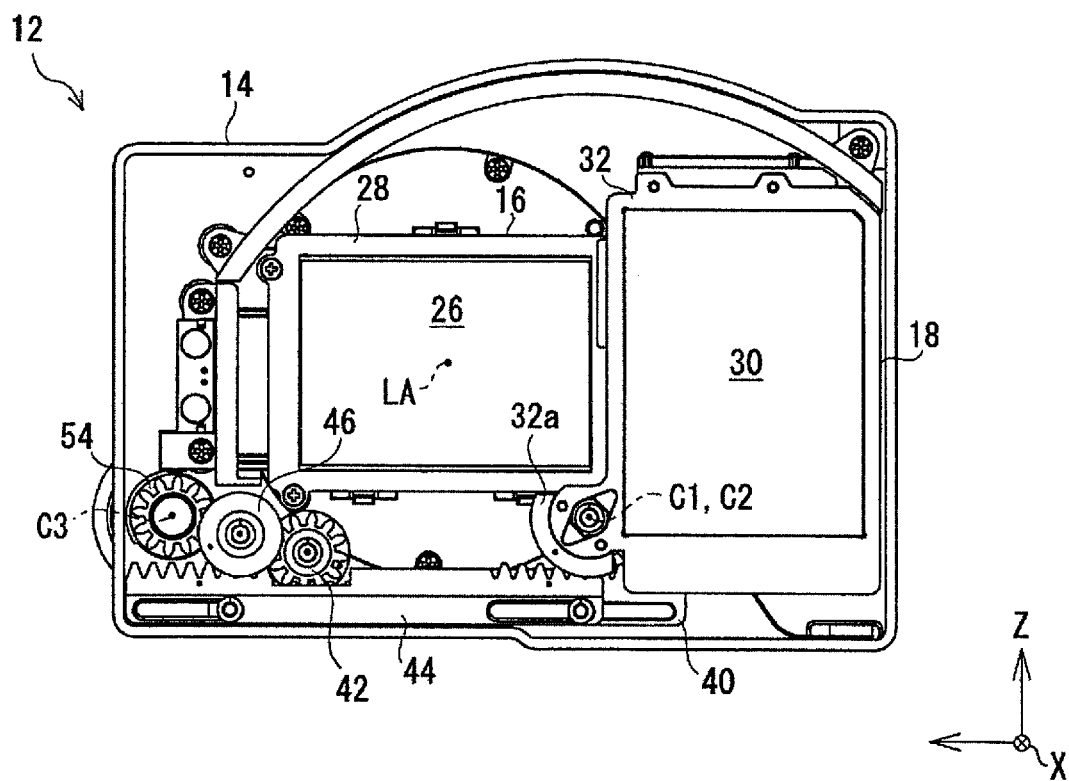
FIG. 4 is a rear view of the filter module in a state where the first filter unit is disposed at the first filtering position and the second filter unit is disposed at the second retracted position.
Figure 5:
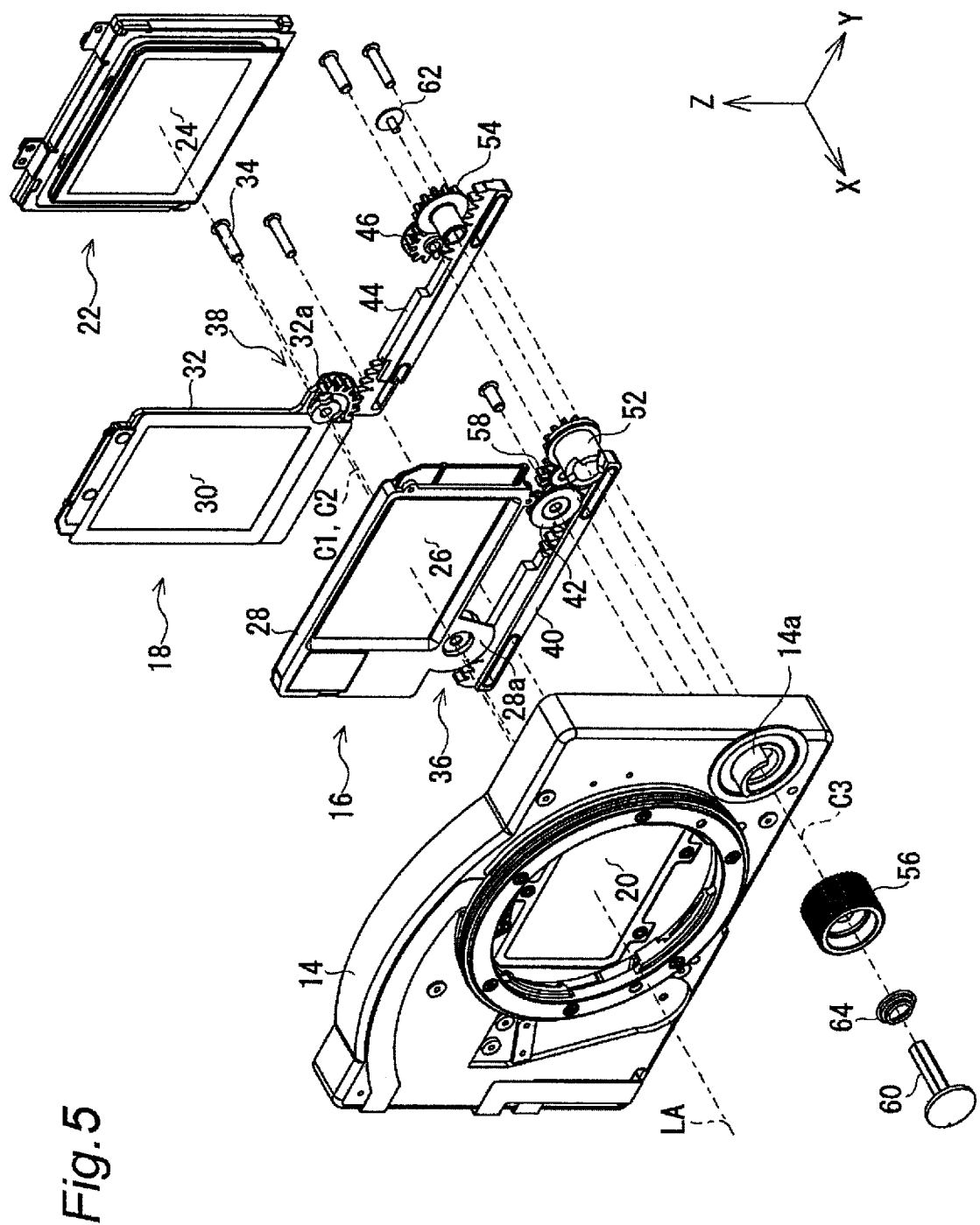
FIG. 5 is a front exploded perspective view of the filter module.
Figure 6:
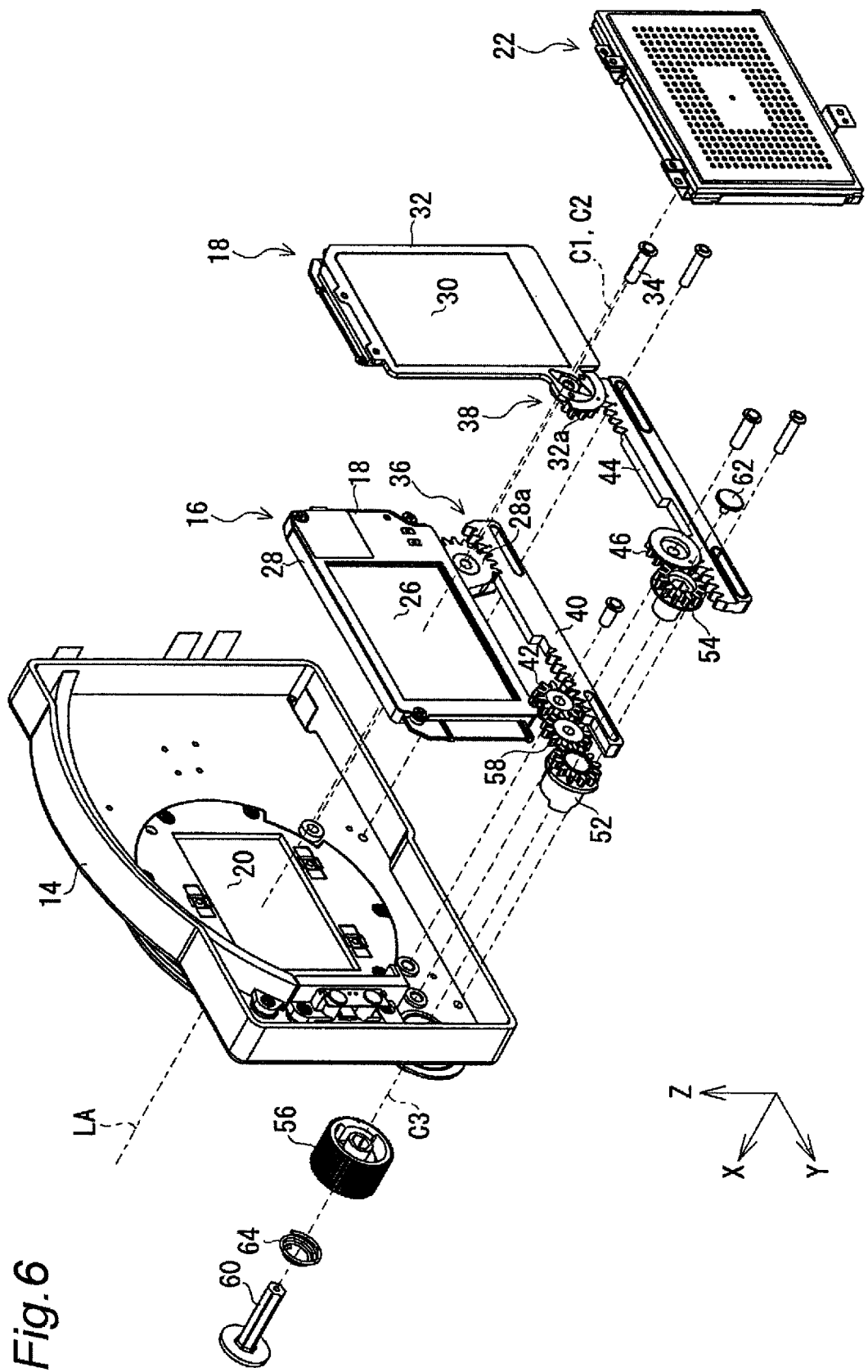
FIG. 6 is a rear exploded perspective view of the filter module.

FIG. 4 is a rear view of the filter module in a state where the first filter unit is disposed at the first filtering position and the second filter unit is disposed at the second retracted position. FIGS. 5 and 6 are respectively a front exploded perspective view and a rear exploded perspective view of the filter module.

As illustrated in FIGS. 2 to 6, in the case of the present embodiment, the filter module 12 includes a casing 14, a first filter unit 16, and a second filter unit 18.

The casing 14 is made of, for example, a metal material such as aluminum die casting, and supports the first and second filter units 16 and 18. In the case of the present embodiment, the casing 14 includes a protective glass through which light from a subject passes.

As illustrated in FIGS. 2, 5, and 6, the imaging apparatus 10 includes an imaging module 22 that faces the protective glass 20 in the extending direction of an optical axis LA of the imaging apparatus 10 (that is, the front-rear direction (X-axis direction) of the imaging apparatus 10) at an interval. Light from a subject enters the imaging module 22. The imaging module 22 includes an imaging element (not illustrated) therein. The imaging element is a photoelectric conversion element such as a CCD or a CMOS, and creates image data of a subject from light (an image of the subject) from the subject incident on the imaging surface through the protective glass 20. Note that the optical axis LA is orthogonal to the imaging surface of the imaging element and passes through the center of a rectangular imaging surface. Furthermore, as illustrated in FIG. 5, in the case of the present embodiment, the imaging module 22 includes a transparent cover glass 24 that is disposed in front of the imaging element and covers and protects the imaging surface of the imaging element.

In the case of the present embodiment, as illustrated in FIGS. 5 and 6, the first filter unit 16 includes a first optical filter 26 and a frame-shaped first frame structure 28 that supports an outer peripheral portion of the first optical filter 26. In addition, the second filter unit 18 includes a second optical filter 30 and a second frame structure 32 that supports an outer peripheral portion of the second optical filter 30.

In the case of the present embodiment, the first optical filter 26 is an electronic ND filter such as a liquid crystal filter, whose light transmittance can be changed. The light transmittance of the first optical filter 26 is changed by changing the driving voltage applied to the first optical filter 26. The second optical filter 30 is a filter such as glass, whose light transmittance cannot be changed, that is, the light transmittance is fixed. In the case of the present embodiment, the first and second optical filters 26 and 30 have a rectangular shape similarly to the imaging surface of the imaging element in the imaging module 22.

The first filter unit 16, that is, the first frame structure 28 supporting the first optical filter 26 is supported by the casing 14 so as to be rotatable about a rotation center line C1 extending in the front-rear direction (X-axis direction) of the imaging apparatus 10. The second filter unit 18, that is, the second frame structure 32 supporting the second optical filter 30 is supported by the casing 14 so as to be rotatable about a rotation center line C2 extending in the front-rear direction of the imaging apparatus 10.

In the case of the present embodiment, as illustrated in FIGS. 5 and 6, the rotation center lines C1 and C2 are located on the same straight line. Therefore, the first filter unit 16 rotates forward with respect to the second filter unit 18. Since the rotation center lines C1 and C2 are located on the same straight line, a support shaft 34 that rotatably supports the first and second filter units 16 and 18 can be shared.

As illustrated in FIGS. 5 and 6, the filter module 12 includes a first rotation mechanism 36 that rotates the first filter unit 16 about the rotation center line C1, and a second rotation mechanism 38 that rotates the second filter unit about the rotation center line C2.

In the case of the present embodiment, the first and second rotation mechanisms 36 and 38 are so-called rack and pinion mechanisms.

The first rotation mechanism 36 includes a first rack 40 that extends in the left-right direction (Y-axis direction) of the imaging apparatus 10 and is supported by the casing 14 so as to be movable in the left-right direction, and a first drive gear 42 that engages with the first rack 40 and moves in the left-right direction. The first rack 40 is engaged with a first pinion portion 28a formed in the first frame structure 28 of the first filter unit 16. When the first rack 40 moves in the left-right direction by the rotation of the first drive gear 42, the first pinion portion 28a rotates about the rotation center line C1. As a result, the first filter unit 16 rotates about the rotation center line C1.

The second rotation mechanism 38 includes a second rack 44 that extends in the left-right direction (Y-axis direction) of the imaging apparatus and is supported by the casing 14 so as to be movable in the left-right direction, and a second drive gear 46 that engages with the second rack 44 and moves in the left-right direction. The second rack 44 extends rearward and parallel to the first rack 40. In addition, the second rack 44 is engaged with a second pinion portion 32a formed in the second frame structure 32 of the second filter unit 18. When the second rack 44 moves in the left-right direction by the rotation of the second drive gear 46, the second pinion portion 32a rotates about the rotation center line C2. As a result, the second filter unit 18 rotates about the rotation center line C2.

The first rotation mechanism 36 rotates the first filter unit 16 about the rotation center line C1 between the first filtering position and the first retracted position. Furthermore, the second rotation mechanism 38 rotates the second filter unit 18 about the rotation center line C2 between the second filtering position and the second retracted position.

As illustrated in FIGS. 3 and 4, the first filter unit 16 is turned by the first rotation mechanism 36 to be disposed in the first filtering position. Specifically, when the first filter unit 16 is located at the first filtering position, the first optical filter 26 exists in front of the imaging surface of the imaging element in the imaging module 22 (that is, in front of the cover glass 24). As a result, light from the subject after passing through the protective glass 20 and before reaching the imaging surface of the imaging element passes through the first optical filter 26. As a result, the light from the subject filtered by the first optical filter 26 passes through the cover glass 24 and enters the imaging surface of the imaging element in the imaging module 22.

Also, when the first filter unit 16 is disposed at the first filtering position, the second filter unit 18 is rotated by the second rotation mechanism 38 and disposed at the second retracted position. Specifically, the second filter unit is retracted to a position deviated from the front of the imaging module 22 as the second retracted position. In the case of the present embodiment, the second filter unit 18 is retracted from the front of the imaging module 22 to the left (when viewed from the front of the imaging apparatus 10). As a result, light from the subject enters the imaging surface of the imaging element in the imaging module 22 without being disturbed by the second filter unit 18, that is, without passing through the second optical filter 30.

Figure 7:
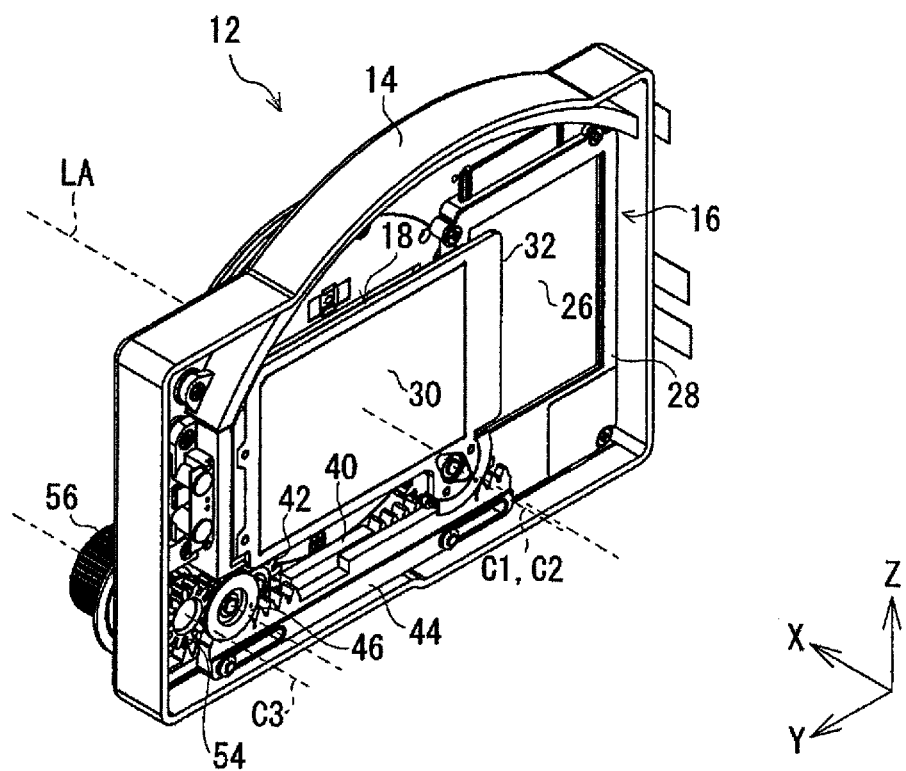
FIG. 7 is a rear perspective view of the filter module in a state where the first filter unit is disposed at the first retracted position and the second filter unit is disposed at the second filtering position.
Figure 8:
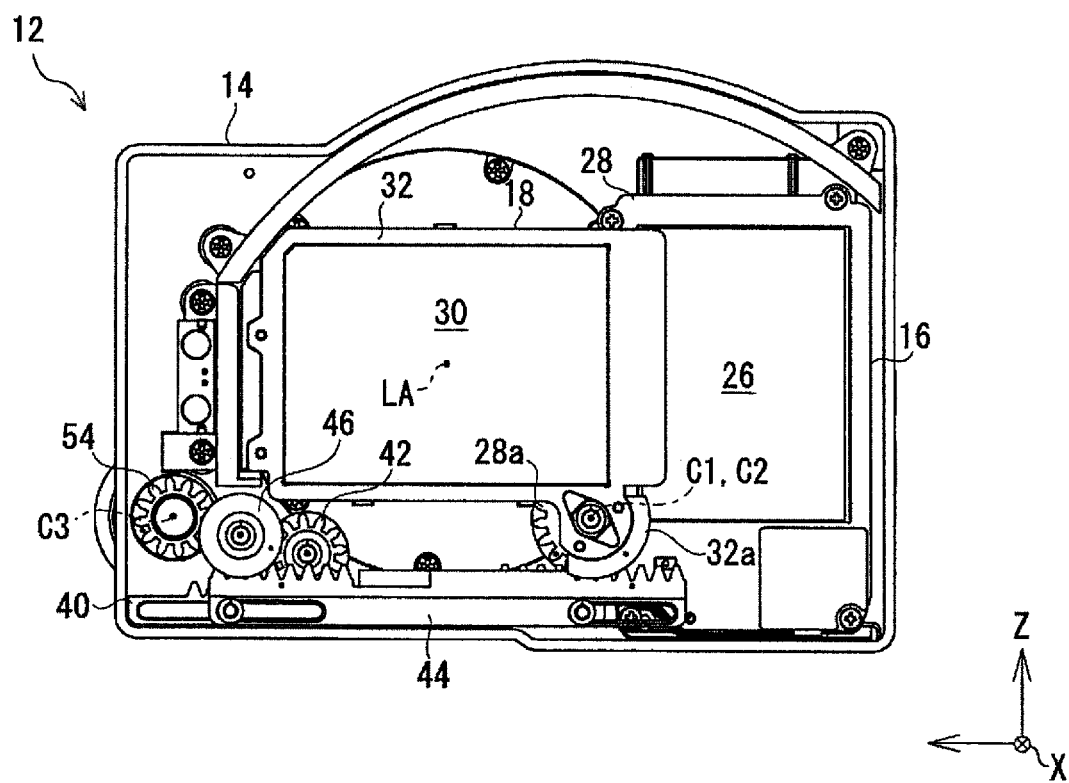
FIG. 8 is a rear view of the filter module in a state where the first filter unit is disposed at the first retracted position and the second filter unit is disposed at the second filtering position.

FIGS. 7 and 8 are respectively a rear perspective view and a rear view of the filter module in a state where the first filter unit is disposed in the first retracted position and the second filter unit is disposed in the second filtering position.

As illustrated in FIGS. 7 and 8, the first filter unit 16 is rotated by the first rotation mechanism 36 to be disposed in the first retracted position. Specifically, the first filter unit 16 is retracted to a position deviated from the front of the imaging module 22 as the first retracted position. In the case of the present embodiment, the first filter unit 16 is retracted from the front of the imaging module 22 to the left (when viewed from the front of the imaging apparatus 10). As a result, light from the subject enters the imaging surface of the imaging element in the imaging module 22 without being disturbed by the first filter unit 16, that is, without passing through the first optical filter 26.

When the first filter unit 16 is disposed at the first retracted position, the second filter unit 18 is rotated by the second rotation mechanism 38 and disposed at the second filtering position. Specifically, when the second filter unit 18 is located at the second filtering position, the second optical filter 30 exists in front of the imaging surface of the imaging element in the imaging module 22. As a result, light from the subject after passing through the protective glass 20 and before reaching the imaging surface of the imaging element passes through the second optical filter 30. As a result, the light from the subject filtered by the second optical filter 30 passes through the cover glass 24 and enters the imaging surface of the imaging element. It should be noted that the second filtering position is located behind the first filtering position.

In the case of the present embodiment, as illustrated in FIGS. 4 and 8, the first filter unit 16 is rotated by substantially 90 degrees about the rotation center line C1 by the first rotation mechanism 36. Therefore, the positional relationship between the first filtering position and the first retracted position is a positional relationship in which the first filter unit 16 located at one of the first filtering position and the first retracted position is disposed at the other when the first filter unit 16 is rotated by 90 degrees. As a result, the posture of the first optical filter 26 of the first filter unit 16 located at the first filtering position and the posture of the first optical filter 26 when located at the first retracted position are different by 90 degrees. That is, the longitudinal direction of the first optical filter 26 changes from the left-right direction (Y-axis direction) to the height direction (Z-axis direction) of the imaging apparatus 10.

Furthermore, in the case of the present embodiment, as illustrated in FIGS. 4 and 8, the second filter unit 18 is rotated by substantially 90 degrees about the rotation center line C2 by the second rotation mechanism 38. Therefore, the positional relationship between the second filtering position and the second retracted position is a positional relationship in which the second filter unit 18 located at one of the second filtering position and the second retracted position is disposed at the other when the second filter unit 18 is rotated by 90 degrees. As a result, the posture of the second optical filter 30 of the second filter unit 18 located at the second filtering position and the posture of the second optical filter 30 when located at the second retracted position are different by 90 degrees. That is, the longitudinal direction of the second optical filter 30 changes from the left-right direction (Y-axis direction) to the height direction (Z-axis direction) of the imaging apparatus 10.

In the state of the filter module 12 illustrated in FIGS. 3, 4, 7, and 8, the first filter unit 16 and the second filter unit 18 do not overlap each other in the front-rear direction (X-axis direction) of the imaging apparatus 10. That is, both the first filter unit 16 and the second filter unit 18 are not disposed at the filtering position or the retracted position while overlapping each other.

Figure 9:
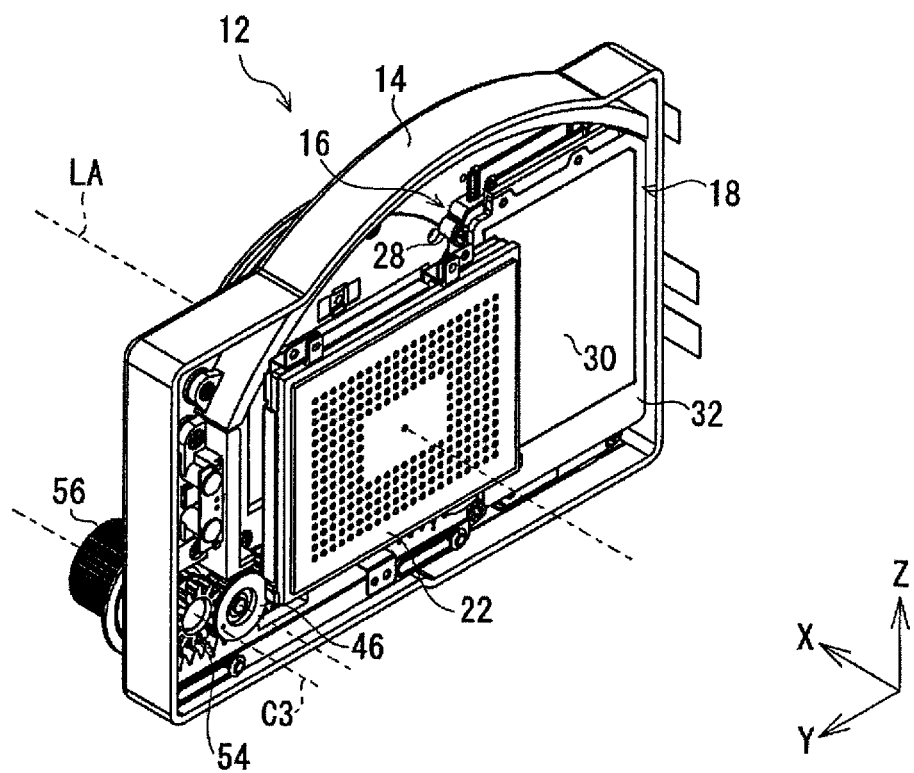
FIG. 9 is a rear perspective view of the imaging module and the filter module in a state where the first filter unit is disposed at the first retracted position and the second filter unit is disposed at the second retracted position.
Figure 10:
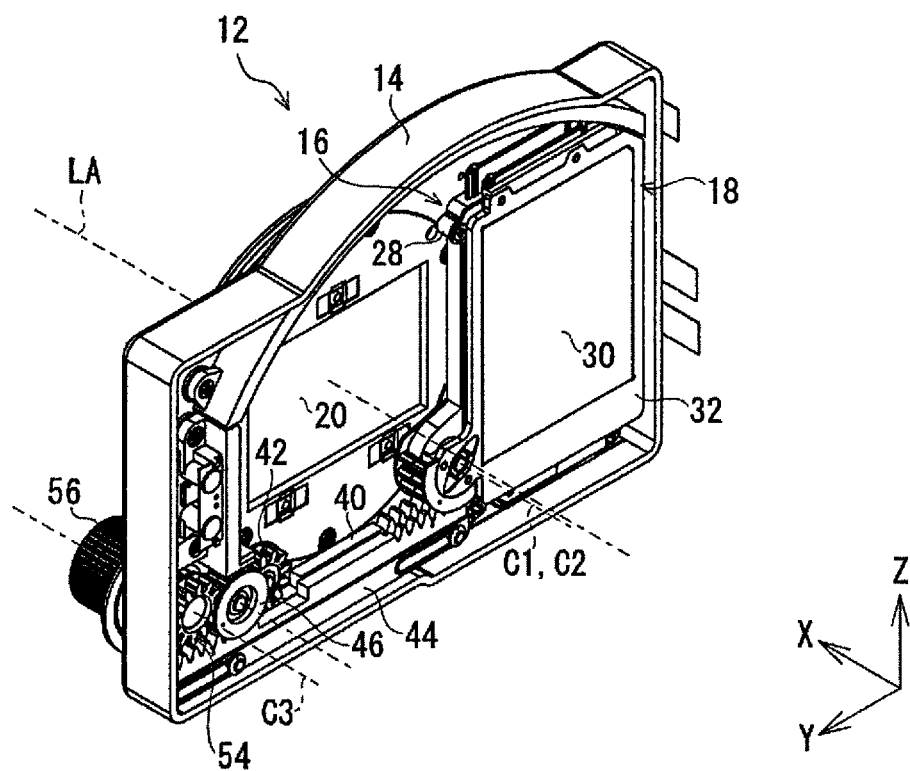
FIG. 10 is a rear perspective view of the filter module in a state where the first filter unit is disposed at the first retracted position and the second filter unit is disposed at the second retracted position.

FIG. 9 is a rear perspective view of the imaging module and the filter module in a state where the first filter unit is disposed at the first retracted position and the second filter unit is disposed at the second retracted position. FIG. 10 is a rear perspective view of the filter module in a state where the first filter unit is disposed at the first retracted position and the second filter unit is disposed at the second retracted position. That is, FIG. 10 corresponds to FIG. 9 in which the imaging module is omitted.

As illustrated in FIGS. 9 and 10, the first filter unit 16 and the second filter unit 18 are located at the first retracted position and the second retracted position, respectively, and overlap each other in the front-rear direction (X-axis direction) of the imaging apparatus 10. As a result, the first filter unit 16 and the second filter unit 18 do not exist between the protective glass 20 and the imaging module 22. That is, the first and second optical filters 26 and 30 do not exist in front of the imaging element in the imaging module 22.

Therefore, the imaging apparatus 10 is configured to be switchable to a first state illustrated in FIGS. 3 and 4, a second state illustrated in FIGS. 7 and 8, and a third state illustrated in FIGS. 9 and 10.

Specifically, in the case of the present embodiment, the first rotation mechanism 36 and the second rotation mechanism 38 receive power supply from a power transmission mechanism.

Figure 11:
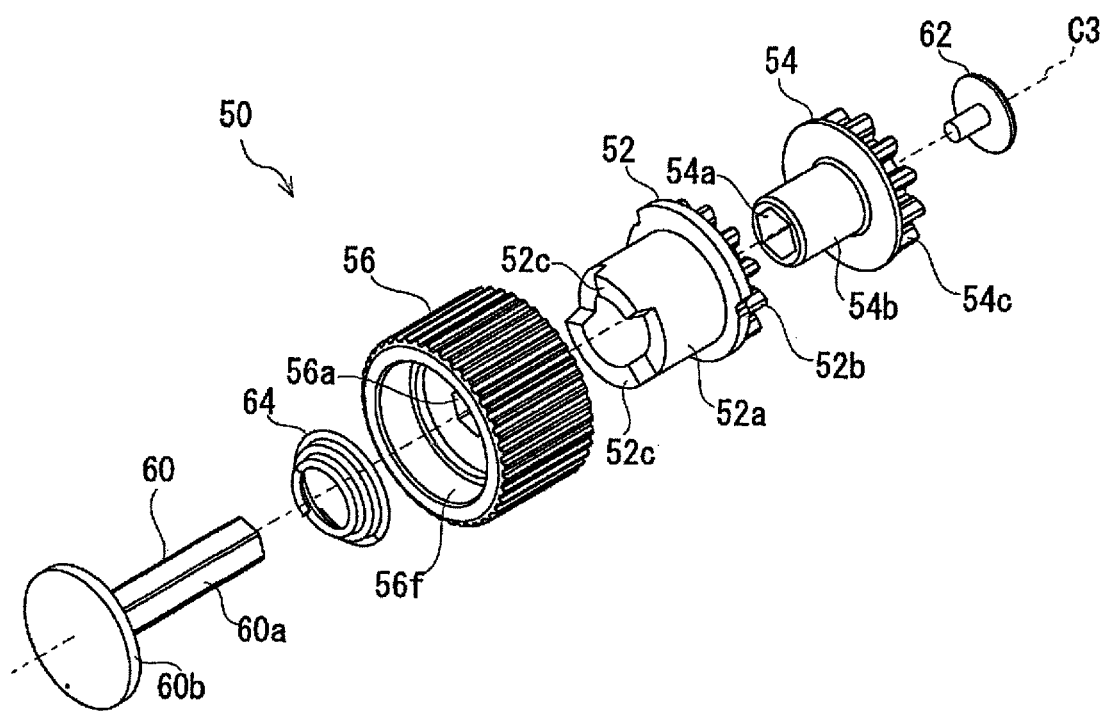
FIG. 11 is an exploded perspective view of a power transmission mechanism.
Figure 12:
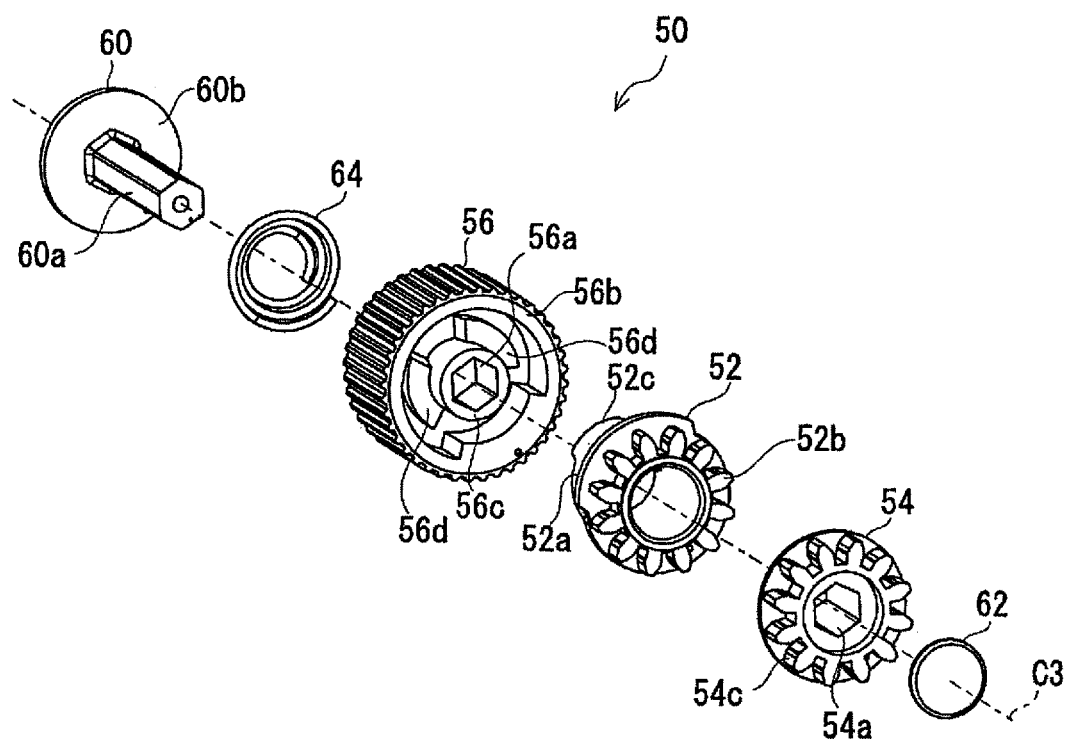
FIG. 12 is an exploded perspective view of the power transmission mechanism viewed from a different viewpoint.
Figure 13A:
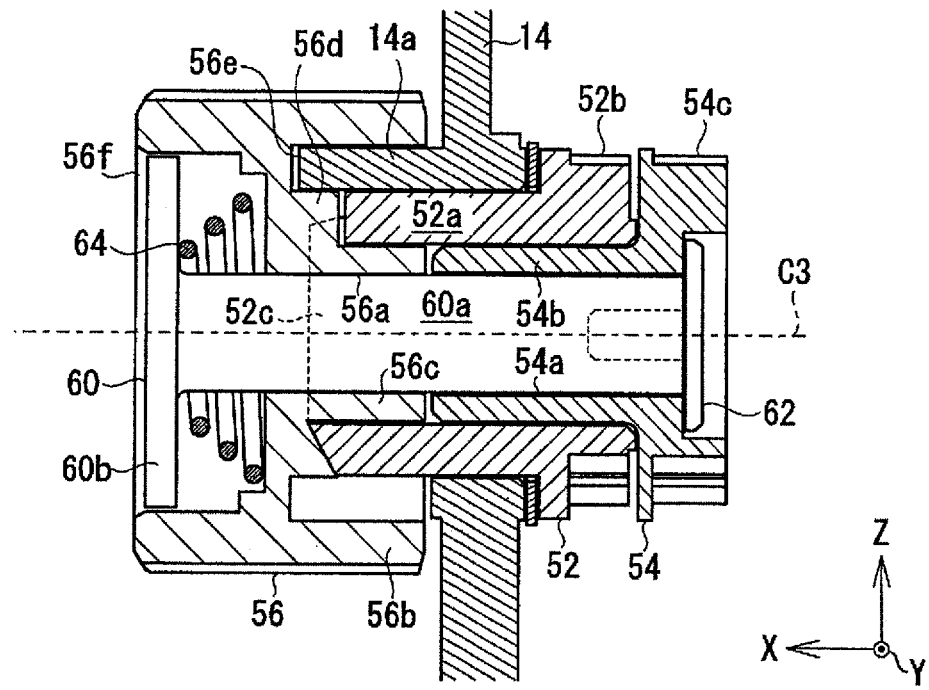
FIG. 13A is a cross-sectional view of the power transmission mechanism in a coupled state.
Figure 13B:
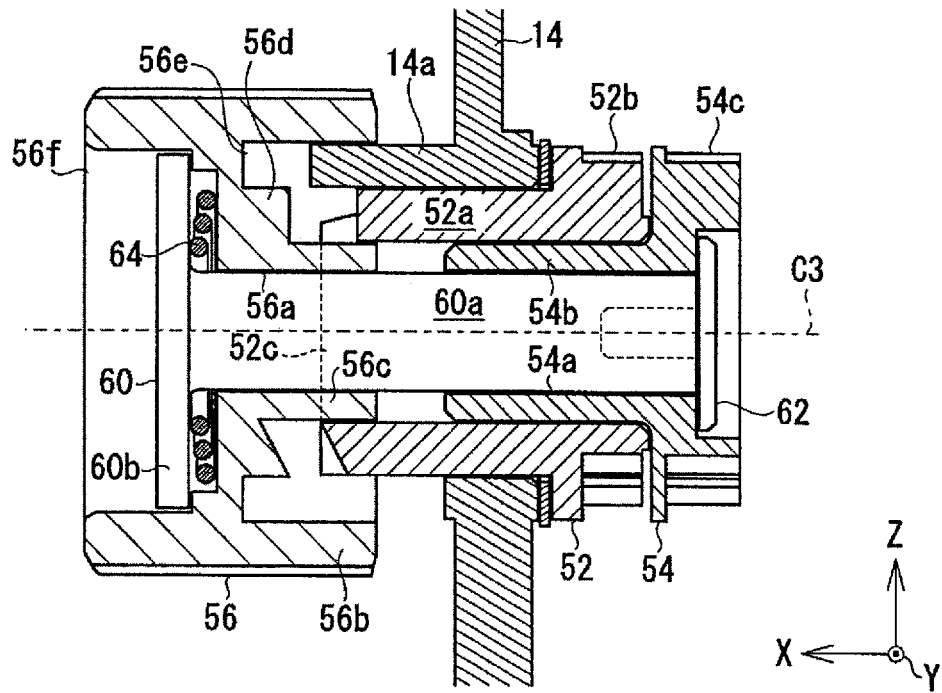
FIG. 13B is a cross-sectional view of the power transmission mechanism in a decoupled state.

FIGS. 11 and 12 are exploded perspective views of the power transmission mechanism viewed from different viewpoints. FIG. 13A is a cross-sectional view of the power transmission mechanism in a coupled state. FIG. 13B is a cross-sectional view of the power transmission mechanism in a decoupled state.

As illustrated in FIGS. 11 and 12, a power transmission mechanism 50 that transmits power for rotating the first filter unit 16 and the second filter unit 18 cooperates with the first rotation mechanism 36 and the second rotation mechanism 38 to construct a filter unit drive mechanism. The filter unit drive mechanism is configured to be able to selectively execute an interlocking mode for driving both the first and second filter units 16 and 18 and a single motion mode for driving only one of the first and second filter units.

Specifically, in the interlocking mode, as illustrated in FIGS. 3, 4, 7, and 8, the first and second filter units 16 and 18 are interlocked by the filter unit drive mechanism such that when one of the first and second filter units 16 and 18 is located at the filtering position, the other is located at the retracted position.

In the single motion mode, as illustrated in FIGS. 9 and 10, while one of the first and second filter units 16 and 18 is stopped at the retracted position, the other is driven by the filter unit drive mechanism. In the case of the present embodiment, in the single motion mode, the second filter unit 18 is driven while the first filter unit 16 is stopped at the first retracted position.

To selectively execute the interlocking mode and the single motion mode, the power transmission mechanism 50 in the filter unit drive mechanism is configured to selectively transmit power to each of the first rotation mechanism 36 rotating the first filter unit 16 and the second rotation mechanism rotating the second filter unit 18. In the case of the present embodiment, in the interlocking mode, the power transmission mechanism 50 is drivingly coupled to both the first and second rotation mechanisms 36 and 38. In the single motion mode, the driving coupling to the first rotation mechanism 36 is released while the driving coupling to the second rotation mechanism 38 is performed.

As illustrated in FIGS. 11 and 12, the power transmission mechanism 50 includes a first transmission gear 52 that transmits power to the first rotation mechanism 36, a second transmission gear 54 that transmits power to the second rotation mechanism 38, and a rotating body 56 that rotates by receiving an external force. In the case of the present embodiment, the rotating body 56 is a rotary knob rotated by a user.

In the case of the present embodiment, as illustrated in FIG. 6, the first transmission gear 52 is engaged with the first drive gear 42 of the first rotation mechanism 36 via a reverse gear 58. The second transmission gear 54 directly engages with the second drive gear 46 of the second rotation mechanism 38.

In the case of the present embodiment, the first transmission gear 52, the second transmission gear 54, and the rotating body 56 rotate about a common rotation center line C3 extending in the front-rear direction (X-axis direction) of the imaging apparatus 10. In addition, the first transmission gear is drivingly coupled to the rotating body 56 in a releasable manner. The second transmission gear 54 is always drivingly coupled to the rotating body 56 (that is, in a non-releasable manner).

Specifically, as illustrated in FIGS. 11, 12, 13A, and 13B, the second transmission gear 54 and the rotating body 56 are drivingly coupled via a coupling shaft 60. The coupling shaft 60 includes a shaft portion 60a having a hexagonal cross section and a head portion 60b provided at one end (front end) of the shaft portion 60a. Hexagonal through holes 54a and 56a through which the shaft portion 60a of the coupling shaft 60 passes are formed in the second transmission gear 54 and the rotating body 56. By the coupling shaft 60, the second transmission gear 54 and the rotating body 56 are always drivingly coupled to each other and rotate synchronously. A stopper screw 62 is attached to the other end (rear end) of the shaft portion 60a of the coupling shaft 60 so that the second transmission gear 54 does not come off from the coupling shaft 60.

The first transmission gear 52 is rotatably supported by the second transmission gear 54. Specifically, the first transmission gear 52 includes a cylindrical portion 52a and a gear portion 52b provided at a rear end of the cylindrical portion 52a and engaged with the reverse gear 58. The second transmission gear 54 includes a cylindrical portion 54b and a gear portion 54c provided at a rear end of the cylindrical portion 54b and engaged with the second drive gear 46. By inserting the cylindrical portion 54b of the second transmission gear 54 into the cylindrical portion 52a of the first transmission gear 52, the first transmission gear 52 is rotatably supported by the second transmission gear 54.

In addition, the first transmission gear 52 is disposed between the rotating body 56 and the second transmission gear 54, and engages with the rotating body 56 in the extending direction (X-axis direction) of the rotation center line C3.

Figure 14:
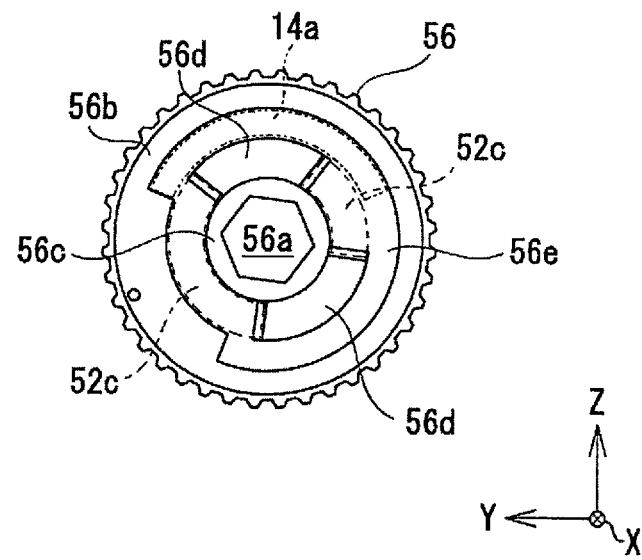
FIG. 14 is a rear view of a rotating body.

FIG. 14 is a rear view of the rotating body.

As illustrated in FIGS. 12 and 14, the rotating body 56 includes an outer cylindrical portion 56b to be gripped by the user and an inner cylindrical portion 56c inserted into the cylindrical portion 52a of the first transmission gear 52. Between the outer cylindrical portion 56b and the inner cylindrical portion 56c, two engagement claw portions 56d protruding toward the first transmission gear 52 and having an arc shape as viewed in the extending direction of the rotation center line C3 (as viewed in the X-axis direction) are concentrically formed.

As illustrated in FIG. 11, two engagement claw portions 52c to be engaged with the two engagement claw portions 56d of the rotating body 56 are formed at the distal end of the cylindrical portion 52a of the first transmission gear 52. As illustrated in FIG. 14, when the two engagement claw portions 52c of the first transmission gear 52 enter the space between the two engagement claw portions 56d of the rotating body 56, the first transmission gear 52 and the rotating body 56 are engaged with each other and drivingly coupled. As a result, when the rotating body 56 rotates about the rotation center line C3, the first transmission gear 52 rotates.

As illustrated in FIG. 14, in the rotating body 56, an arc-shaped space 56e is provided between the outer cylindrical portion 56b and the two engagement claw portions 56d as viewed in the extending direction of the rotation center line C3 (as viewed in the X-axis direction). In the space 56e, an arc-shaped protrusion 14a of the casing 14 illustrated in FIG. 5 is disposed. When the rotating body 56 rotates, the arc-shaped protrusion 14a moves in the space 56e. The arc-shaped protrusion 14a restricts the rotation stroke of the rotating body 56.

The rotating body 56 is provided in the power transmission mechanism 50 so as to be slidable in the extending direction of the rotation center line C3. In the present embodiment, the rotating body 56 slides along the shaft portion 60a of the coupling shaft 60. This sliding causes the rotating body 56 to engage with or separate from the first transmission gear 52. As a result, the rotating body 56 and the first transmission gear 52 are drivingly coupled to each other or the driving coupling is released.

In order to maintain the engagement (driving coupling) between the rotating body 56 and the first transmission gear 52, the rotating body 56 is biased toward the first transmission gear 52 by a spring 64. At the front end of the rotating body 56, a recessed portion 56f for accommodating the head portion 60b of the coupling shaft 60 and the spring 64 is formed. The spring 64 is compressed by being sandwiched between the head portion 60b of the coupling shaft 60 and the bottom surface of the recessed portion 56f of the rotating body 56.

In such a filter unit drive mechanism (the power transmission mechanism 50 thereof), when the user slides the rotating body 56 forward against the biasing force of the spring 64, the engagement (driving coupling) between the first transmission gear 52 and the rotating body 56 is released. That is, the interlocking mode is switched to the single motion mode.

In the interlocking mode (state in which the user does not slide the rotating body 56 forward), when the user rotates the rotating body 56, both the first transmission gear 52 and the second transmission gear 54 rotate synchronously. This causes the first drive gear 42 in driving coupling with the first transmission gear 52 to move the first rack 40, thereby rotating the first pinion portion 28a of the frame structure 28 of the first filter unit 16. As a result, the first filter unit 16 rotates about the rotation center line C1. At the same time, the second drive gear 46 in driving coupling with the second transmission gear 54 moves the second rack 44, thereby rotating the second pinion portion 32a of the frame structure 32 of the second filter unit 18. As a result, the second filter unit rotates about the rotation center line C2. At this time, since the reverse gear exists between the first transmission gear 52 and the first drive gear 42, the second filter unit 18 rotates in the opposite direction with respect to the first filter unit 16.

Therefore, in the interlocking mode, when the user rotates the rotating body 56 in one rotation direction, the first filter unit 16 moves from the first filtering position to the first retracted position, and at the same time, the second filter unit 18 moves from the second retracted position to the second filtering position. When the rotating body 56 is rotated in the other rotation direction, the first filter unit 16 moves from the first retracted position to the first filtering position, and at the same time, the second filter unit 18 moves from the second filtering position to the second retracted position.

In the single motion mode (state where the user slides and maintains the rotating body 56 forward), when the user rotates the rotating body 56, only the second transmission gear 54 rotates. On the other hand, the rotating body 56 idles with respect to the first transmission gear 52.

In such a single motion mode, as illustrated in FIGS. 9 and 10, the first filter unit 16 can be disposed at the first retracted position, and the second filter unit 18 can be disposed at the second retracted position.

First, in the interlocking mode, as illustrated in FIGS. 7 and 8, the first filter unit 16 is disposed at the first retracted position, and the second filter unit 18 is disposed at the second filtering position. In this state, the mode is switched to the single motion mode. When the rotating body 56 rotates in the state of switching to the single motion mode, the second filter unit 18 moves from the second filtering position to the second retracted position while maintaining the state in which the first filter unit 16 stops at the first retracted position. This causes a state where the first and second filter units 16 and 18 do not exist between the protective glass 20 and the imaging module 22. As a result, the imaging module 22 can be accessed from the front.

Figure 15:
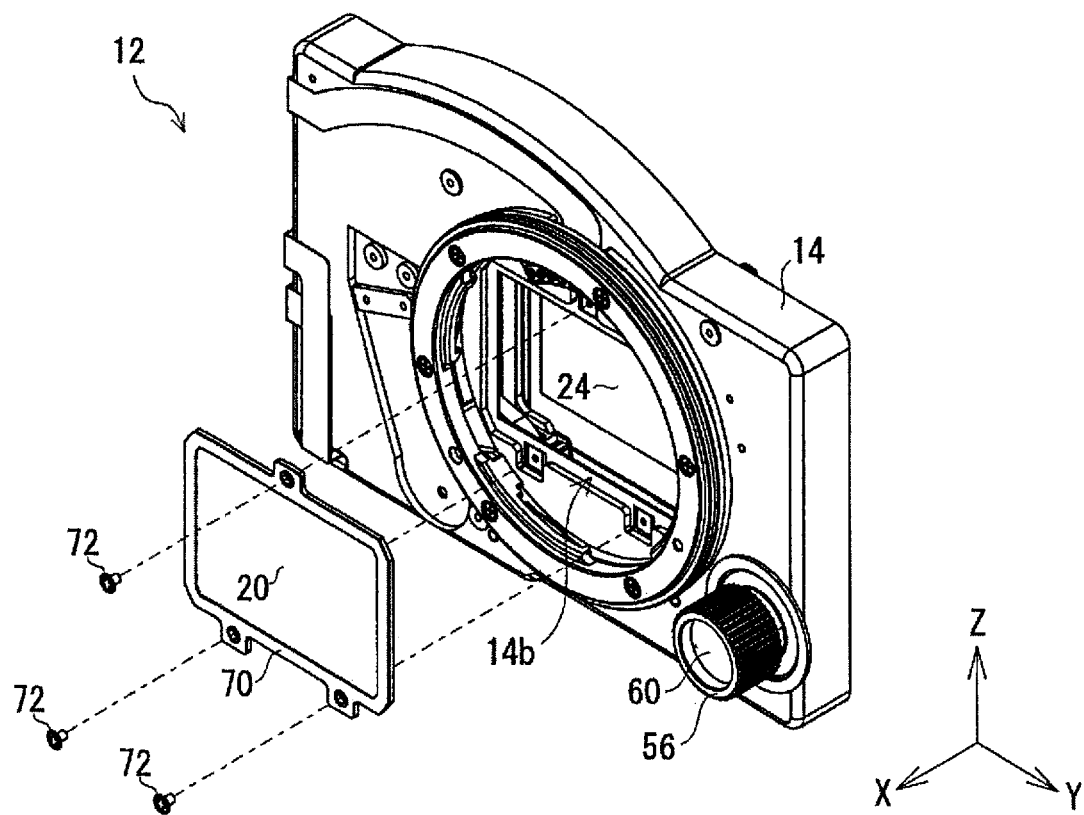
FIG. 15 is a front perspective view of the filter module during cleaning of the imaging module.

FIG. 15 is a front perspective view of the filter module during cleaning of the imaging module.

If the first and second filter units 16 and 18 do not exist between the protective glass 20 and the imaging module 22, the cover glass 24 of the imaging module 22 can be accessed from the front as illustrated in FIG. 15. In the case of the present embodiment, the protective glass 20 is supported by a support frame 70. The support frame 70 is fixed to the casing 14 via a plurality of fixing screws 72. Therefore, when the support frame 70 is removed from the casing 14, the cover glass 24 of the imaging module 22 is exposed to the outside through an opening 14b of the casing 14 closed by the protective glass 20. As a result, the cover glass 24 can be accessed. For example, dust and the like attached to the cover glass 24 can be removed by cleaning.

Note that not only the cover glass 24 of the imaging module 22 but also the front surfaces of the optical filters 26 and 30 of the first and second filter units 16 and 18 can be similarly accessed. That is, as illustrated in FIGS. 3 and 4, when the first filter unit 16 is located at the first filtering position, the front surface of the first optical filter 26 is accessible. As illustrated in FIGS. 7 and 8, when the second filter unit 18 is located at the second filtering position, the front surface of the second optical filter 30 is accessible.

According to the present embodiment as described above, in the imaging apparatus 10 in which the first and second optical filters 26 and 30 are selectively disposed in front of the imaging surface of the imaging element (specifically, the cover glass 24 of the imaging module 22), access to the imaging surface of the imaging element is facilitated.

Specifically, both the first and second filter units 16 and 18 including the first and second optical filters 26 and 30, respectively, can be retracted from the front of the imaging surface of the imaging element. As a result, the imaging surface of the imaging element can be accessed without removing the first and second filter units 16 and 18.

Although the embodiments of the present disclosure have been described above with reference to the above-described embodiments, embodiments of the present disclosure are not limited to the above-described embodiments.

For example, in the case of the above-described embodiment, in the single motion mode, the driving coupling between the rotating body 56 and the first transmission gear 52 (that is, the first filter unit 16) is released, and the driving coupling between the rotating body 56 and the second transmission gear (that is, the second filter unit 18) is maintained. However, embodiments of the present disclosure are not limited thereto. In the single motion mode, the driving coupling between the rotating body and the first filter unit may be maintained, and the driving coupling between the rotating body and the second filter unit may be released.

In the case of the above-described embodiment, each of the first and second filter units 26 and 30 is rotated by the first and second rotation mechanisms 36 and 38, that is, a so-called rack and pinion mechanism, as illustrated in FIGS. 5 and 6. However, embodiments of the present disclosure are not limited thereto.

Figure 16A:
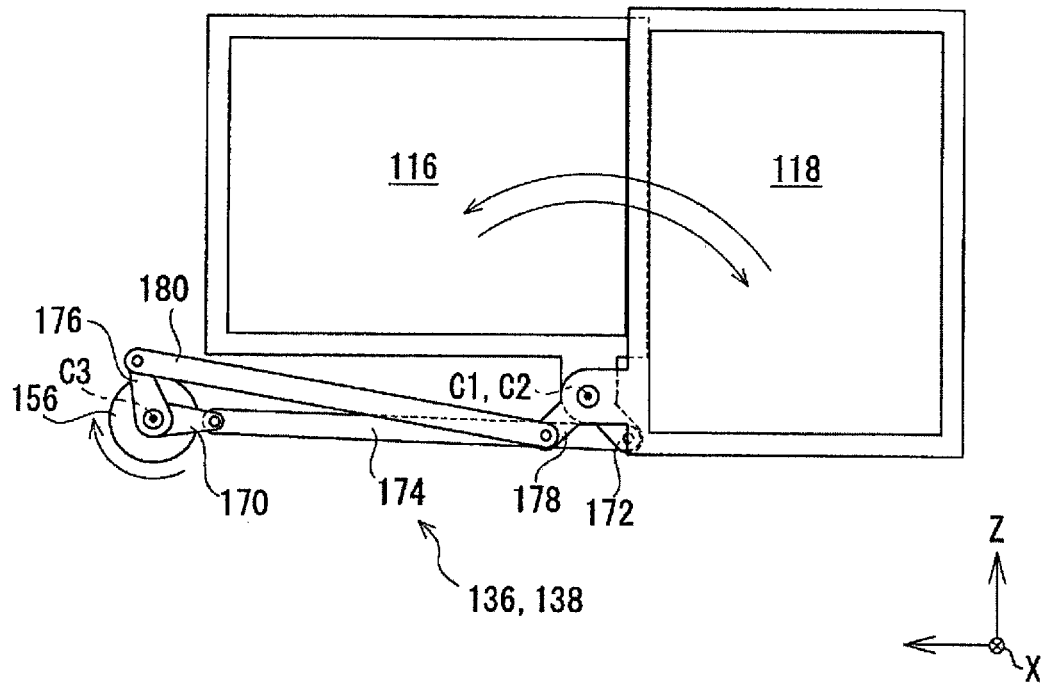
FIG. 16A is a diagram schematically illustrating first and second rotation mechanisms in a state where a first filter unit is disposed at a first filtering position and a second filter unit is disposed at a second retracted position, in an imaging apparatus according to another embodiment.
Figure 16B:
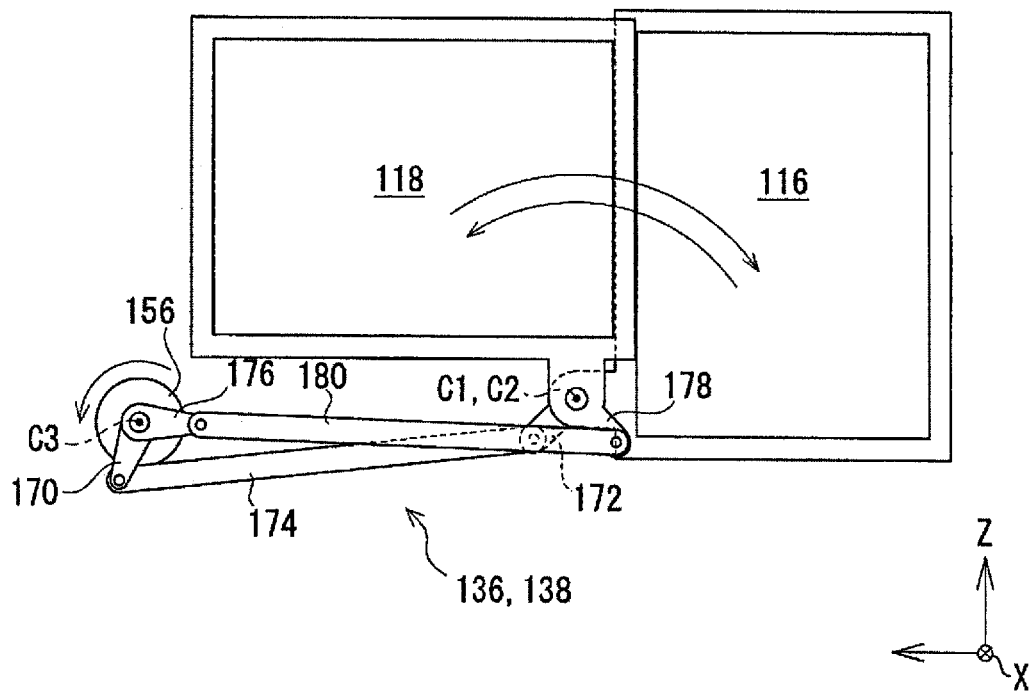
FIG. 16B is a diagram schematically illustrating the first and the second rotation mechanisms in a state where the first filter unit is disposed at a first retracted position and the second filter unit is disposed at a second filtering position.

FIGS. 16A and 16B are diagrams schematically illustrating first and second rotation mechanisms in an imaging apparatus according to another embodiment. FIG. 16A illustrates a state in which a first filter unit 116 is disposed in a first filtering position and a second filter unit 118 is disposed in a second retracted position. FIG. 16B illustrates a state in which the first filter unit 116 is disposed in a first retracted position and the second filter unit 118 is disposed in a second filtering position.

In the imaging apparatus according to another embodiment illustrated in FIGS. 16A and 16B, a first rotation mechanism 136 and a second rotation mechanism 138 that rotate the first filter unit 116 and the second filter unit 118, respectively, are so-called lever crank mechanisms. Note that the first rotation mechanism 136 and the second rotation mechanism 138 have substantially the same configuration. Also, the rotation center line C1 of the first filter unit 116 and the rotation center line C2 of the second filter unit 118 are located on the same straight line.

The first rotation mechanism 136, which is a so-called lever crank mechanism, includes a crank 170 having one end coupled to a rotating body 156, a lever 172 having one end coupled to the first filter unit 116, and a link 174 having one end rotatably coupled to the other end of the crank 170 and having the other end rotatably coupled to the other end of the lever 172.

The second rotation mechanism 138, which is a so-called lever crank mechanism, includes a crank 176 having one end coupled to the rotating body 156, a lever 178 having one end coupled to the second filter unit 118, and a link 180 having one end rotatably coupled to the other end of the crank 176 and having the other end rotatably coupled to the other end of the lever 172.

As illustrated in FIG. 16A, when the rotating body 156 rotates clockwise about the rotation center line C3, the crank 170 pulls the lever 172 via the link 174. Accordingly, the first filter unit 116 rotates clockwise about the rotation center line C1 and moves from the first filtering position to the first retracted position illustrated in FIG. 16B. At the same time, the crank 176 pushes the lever 178 via the link 180. As a result, the second filter unit 118 rotates counterclockwise about the rotation center line C2, and moves from the second retracted position to the second filtering position illustrated in FIG. 16B.

As illustrated in FIG. 16B, when the rotating body 156 rotates counterclockwise about the rotation center line C3, the first filter unit 116 rotates counterclockwise about the rotation center line C1 via the crank 170, the lever 172, and the link 174. Accordingly, the first filter unit 116 moves from the first retracted position to the first filtering position illustrated in FIG. 16A. At the same time, the second filter unit 118 rotates clockwise about the rotation center line C2 via the crank 176, the lever 178, and the link 180. Accordingly, the second filter unit 118 moves from the second filtering position to the second retracted position illustrated in FIG. 16A.

In the case of this another embodiment, one of the crank 170 in the first rotation mechanism 136 and the crank 176 in the second rotation mechanism 138 is always drivingly coupled to the rotating body 156, and the other is drivingly coupled to the rotating body 156 in a releasable manner. In addition, in the case of the above-described embodiment, the rotating body 56 is rotated by the user and is slid in the extending direction (X-axis direction) of the rotation center line C3 by the user. However, embodiments of the present disclosure are not limited thereto. For example, the rotating body may be rotationally driven by a motor and slid by an actuator. That is, the rotating body is provided on the output shaft of the motor so as to be slidable in the extending direction of the rotation center line of the motor, and the actuator slides the rotating body in the direction of the rotation center line.

Furthermore, in the case of the above-described embodiment, the first filter unit 16 is rotated between the first filtering position and the first retracted position by the first rotation mechanism 36. In addition, the second filter unit 18 rotates between the second filtering position and the second retracted position by the second rotation mechanism 38. However, embodiments of the present disclosure are not limited thereto. The first and second filter units may be translated between the filtering position and the retracted position.

That is, in a broad sense, an imaging apparatus according to an embodiment of the present disclosure includes: an imaging element including an imaging surface on which light from a subject is incident; a first filter unit including a first optical filter; a second filter unit including a second optical filter; and a filter unit drive mechanism that drives each of the first and second filter units between a filtering position in front of the imaging surface and a retracted position deviated from the front of the imaging surface, in which the filter unit drive mechanism selectively executes an interlocking mode in which when one of the first and second filter units is located at the filtering position, the other of the first and second filter units is interlocked so as to be located at the retracted position, and a single motion mode in which one of the first and second filter units is maintained in a stopped state at the retracted position and the other one is driven.

As described above, the above-described embodiments have been described as examples of the technique in the present disclosure. To this end, the drawings and detailed description are provided. Therefore, the components described in the drawings and the detailed description may include not only components essential for solving the problem but also components that are not essential for solving the problem in order to illustrate the above-described technology. Therefore, it should not be immediately recognized that these non-essential components are essential based on the fact that these non-essential components are described in the drawings and the detailed description.

In addition, since the above-described embodiments are intended to illustrate the technique in the present disclosure, various changes, replacements, additions, omissions, and the like can be made within the scope of the claims or equivalents thereof.

The present disclosure is applicable to an imaging apparatus in which a plurality of optical filters are selectively arranged in front of an imaging surface of an imaging element.

What is claimed is:
1. An imaging apparatus comprising:
an imaging element including an imaging surface on which light from a subject is incident;
a first filter unit including a first optical filter;
a second filter unit including a second optical filter; and
a filter unit drive mechanism that drives each of the first and second filter units between a filtering position in front of the imaging surface and a retracted position deviated from the front of the imaging surface, wherein
the filter unit drive mechanism includes:
a first rotation mechanism that rotates the first filter unit between the filtering position and the retracted position;
a second rotation mechanism that rotates the second filter unit between the filtering position and the retracted position; and
a power transmission mechanism selectively transmits power to each of the first and second rotation mechanisms,
the filter unit drive mechanism selectively executes an interlocking mode in which when one of the first and second filter units is located at the filtering position, the other of the first and second filter units is interlocked so as to be located at the retracted position, and a single motion mode in which one of the first and second filter units is maintained in a stopped state at the retracted position and the other one is driven, in the interlocking mode, the power transmission mechanism is drivingly coupled to both the first and second rotation mechanisms, and in the single motion mode, the power transmission mechanism is drivingly coupled to one of the first and second rotation mechanisms and releases driving coupling to the other.

2. The imaging apparatus according to claim 1, wherein the power transmission mechanism includes a first transmission gear that transmits power to the first rotation mechanism, a second transmission gear that transmits power to the second rotation mechanism, and a rotating body that rotates by receiving an external force, one of the first and second transmission gears is always drivingly coupled to the rotating body, and the other of the first and second transmission gears is drivingly coupled to the rotating body in a releasable manner.

3. The imaging apparatus according to claim 2, wherein the first transmission gear, the second transmission gear, and the rotating body rotate about a common rotation center line, the rotating body is provided in the power transmission mechanism so as to be slidable in an extending direction of the rotation center line while maintaining driving coupling with one of the first transmission gear and the second transmission gear, and the rotating body is engaged with or separated from the other of the first and second transmission gears by sliding.

4. The imaging apparatus according to claim 3, wherein the power transmission mechanism includes a spring that biases the rotating body toward the other of the first and second transmission gears.

5. The imaging apparatus according to claim 2, wherein the rotating body is a rotary knob rotated by a user.

6. The imaging apparatus according to claim 2, wherein the first rotation mechanism includes a first pinion portion provided in the first filter unit, a first rack engaged with the first pinion portion, and a first drive gear engaged with the first rack and the first transmission gear, the second rotation mechanism includes a second pinion portion provided in the second filter unit, a second rack engaged with the second pinion portion, and a second drive gear engaged with the second rack and the second transmission gear, and a reverse gear is provided between the first drive gear and the first transmission gear or between the second drive gear and the second transmission gear.

* * * * *